United States Patent
Ye et al.

(10) Patent No.: US 11,037,336 B2
(45) Date of Patent: Jun. 15, 2021

(54) METHOD FOR PROCESSING UNMATCHED LOW-DOSE X-RAY COMPUTED TOMOGRAPHY IMAGE USING NEURAL NETWORK AND APPARATUS THEREFOR

(71) Applicants: Korea Advanced Institute of Science and Technology, Daejeon (KR); The Asan Foundation, Seoul (KR); University of Ulsan Foundation For Industry Cooperation, Ulsan (KR)

(72) Inventors: JongChul Ye, Daejeon (KR); Eunhee Kang, Daejeon (KR); Dong Hyun Yang, Seoul (KR); Joon Bum Seo, Seoul (KR); Hyun Jung Koo, Seoul (KR)

(73) Assignees: The Asan Foundation, Seoul (KR); University of Ulsan Foundation for Industry Cooperation, Ulsan (KR); Korea Advanced Institute of Science and Teclmoiogy, Daejeon (KR)

(*) Notice: Subject to any disclaimer, the term of this patent is extended or adjusted under 35 U.S.C. 154(b) by 108 days.

(21) Appl. No.: 16/409,541

(22) Filed: May 10, 2019

(65) Prior Publication Data
US 2020/0118306 A1    Apr. 16, 2020

(30) Foreign Application Priority Data
Oct. 12, 2018   (KR) .......................... 10-2018-0121769

(51) Int. Cl.
G06T 11/00    (2006.01)
G06T 5/00     (2006.01)
G06T 7/00     (2017.01)

(52) U.S. Cl.
CPC ............ *G06T 11/003* (2013.01); *G06T 5/002* (2013.01); *G06T 7/0012* (2013.01); *G06T 2207/10072* (2013.01); *G06T 2207/10116* (2013.01); *G06T 2207/20084* (2013.01)

(58) Field of Classification Search
CPC ..... G06T 11/003; G06T 5/002; G06T 7/0012; G06T 2207/20084; G06T 2207/10116; G06T 2207/10072; G06T 2207/10081; G06T 2207/20081
See application file for complete search history.

(56) References Cited

U.S. PATENT DOCUMENTS

| | | | |
|---|---|---|---|
| 2013/0245429 A1 | 9/2013 | Zhang et al. | |
| 2015/0201895 A1 | 7/2015 | Suzuki | |
| 2016/0328842 A1* | 11/2016 | Ye | G06T 11/006 |
| 2018/0075581 A1 | 3/2018 | Shi et al. | |
| 2018/0341248 A1* | 11/2018 | Mehr | G06N 3/0454 |
| 2019/0108659 A1* | 4/2019 | Li | G06T 5/002 |
| 2020/0111194 A1* | 4/2020 | Wang | G06N 3/0454 |

OTHER PUBLICATIONS

Kang et al., "Cycle Consistent Adversarial Denoising Network for Multiphase Coronary CT Angiography", 2018, pp. 1-9.

* cited by examiner

*Primary Examiner* — Christopher M Brandt
(74) *Attorney, Agent, or Firm* — Blank Rome LLP

(57) ABSTRACT

A method for processing an unmatched low-dose X-ray computed tomography (CT) image using a neural network and an apparatus therefor are provided. The method includes receiving a low-dose X-ray CT image and removing noise from the low-dose X-ray CT image using a unsupervised learning based neural network learned using unmatched data to reconstruct a routine-dose X-ray CT image corresponding to the low-dose X-ray CT image.

8 Claims, 8 Drawing Sheets

METHOD FOR PROCESSING UNMATCHED LOW-DOSE X-RAY COMPUTED TOMOGRAPHY IMAGE USING NEURAL NETWORK AND APPARATUS THEREFOR

CROSS-REFERENCE TO RELATED APPLICATIONS

This application claims priority under 35 U.S.C. § 119 to Korean Patent Application No. 10-2018-0121769 filed on Oct. 12, 2018, in the Korean Intellectual Property Office, the disclosures of which are incorporated by reference herein in their entireties.

BACKGROUND

Embodiments of the inventive concept described herein relate to a method for processing images using a neural network and an apparatus therefor, and more particularly, relate to a method for reconstructing a low-dose X-ray computed tomography (CT) image including noise as a high-quality image denoised using a unsupervised learning based neural network learned using unmatched data and an apparatus therefor.

X-ray CT is one of the most widely used imaging modalities for diagnostic purpose and is applied and used to various situations. For example, in cardiac coronary CT angiography (CTA), a series of CT images are acquired while examination is conducted with contrast agent injection, which helps clinicians to identify the degree of calcification of coronary artery and stenosis in the coronary artery of the heart. In this case, since imaging is performed using X-rays, radiation exposure from CT may increase potential cancer risks.

To reduce the risk of radiation exposure in coronary CTA, the X-ray tube current is modulated for each cardiac phase as shown in FIG. 1. Although this tube current modulation may reduce the total radiation dose, this results in CT images with different noise levels and contrast at different cardiac phases. Specifically, it introduces noises in the projection data of the low-dose phases, which deteriorates the reconstruction image quality. In the related art to address this problem, iterative reconstruction methods, for example, model-based iterative reconstruction (MBIR) methods are applied to obtain the clear images. However, the MBIR approaches suffer from relatively long reconstruction time due to the iterative applications of forward and back projections.

Currently much researched deep learning approaches have demonstrated impressive performance improvement over iterative methods. The deep learning approaches removes noise through supervised learning capable of performing network learning when the low-dose CT image, most of which is the input value, and the normal-dose CT image, which is the target value, should be identical to each other in location and values except for noise.

Recently, deep learning approaches have demonstrated impressive performance improvement over conventional iterative methods for low-dose CT and sparse-view CT. The main advantage of deep learning approach over the conventional MBIR approaches is that the network learns the image statistics in a fully data-driven way rather than using hand-tuned regularizations. While these approaches usually take time for training, real-time reconstruction is possible once the network is trained, making the algorithm very practical in the clinical setting. The deep learning approaches may remove noise through supervised learning capable of performing network learning when the low-dose CT image, most of which is the input value, and the normal (or routine)-dose CT image, which is the target value, should be identical to each other in location and values except for noise. However, in real clinical situation, matched low- and routine-dose CT image pairs are difficult to obtain, since patients should undergo multiple scans with additional radiation exposure to get paired CT images. In coronary CTA, due to the cardiac motion, the low-dose CT image and the routine-dose CT image, the location and shape of the heart of which is correctly identical to each other, are unable to be obtained. Furthermore, contrast agent injection results in CT values which vary over time. Thus, the conventional supervised learning method is unable to be applied.

To address these unmatched pair problems, the related art proposed a low-dose CT denoising network with generative adversarial network (GAN) loss so that the distribution of the denoising network outputs may match the routine dose images. However, one of the important limitations of GAN for CT denoising is that there is a potential risk that the network may generate features that are not present in the images due to the degeneracy of mapping. This happens when GAN is trained to match the data distributions but it does not guarantee that input and output data are paired in a meaningful way, i.e. there may exist various inputs (or outputs) that do not match to one output (or input) despite them generating the same distribution.

SUMMARY

Embodiments of the inventive concept provide a method for processing an image to reconstruct a low-dose X-ray CT image including noise as a high-quality image denoised using a unsupervised learning based neural network and an apparatus therefor.

Embodiments of the inventive concept provide a method for processing an image to remove noise from a low-dose X-ray CT image using a unsupervised learning based neural network learned using unmatched data to reconstruct the low-dose X-ray CT image as a high-quality image and an apparatus therefor.

Embodiments of the inventive concept provide a method for processing an image to increase reconstruction performance, reduce an amount of calculation necessary for reconstruction, and enhance a reconstruction speed by configuring a neural network using a local basis and a non-local basis according to a convolutional framelet.

According to an exemplary embodiment, an image processing method may include receiving a low-dose X-ray computed tomography (CT) image and removing noise from the low-dose X-ray CT image using a unsupervised learning based neural network learned using unmatched data to reconstruct a routine-dose X-ray CT image corresponding to the low-dose X-ray CT image.

The neural network may be learned based on a predefined identity loss, a predefined cyclic loss, and a predefined adversarial loss, with respect to the low-dose X-ray CT image and the routine-dose X-ray CT image.

The image processing method may further include learning a first neural network, a second neural network, and a discriminator based on an identity loss between a captured first low-dose X-ray CT image and a denoised first routine-dose X-ray CT image output using the first neural network, a cyclic loss between the first low-dose X-ray CT image and a second low-dose X-ray CT image including noise, output using the second neural network which receives the first routine-dose X-ray CT image, and an adversarial loss of the discriminator for discriminating between the first low-dose X-ray CT image and a third low-dose X-ray CT image for a captured second routine-dose X-ray CT image output using the second neural network. The reconstructing may include reconstructing the routine-dose X-ray image corresponding to the low-dose X-ray CT image using the learned first neural network.

The neural network may include a neural network based on a convolutional framelet.

The neural network may include a first neural network part configured to receive a first low-dose X-ray CT image and output a first routine-dose X-ray CT image corresponding to the first low-dose X-ray CT image, a second neural network part configured to receive an output image of the first neural network part and output a second low-dose X-ray CT image corresponding to the output image, a third neural network part configured to receive a second routine-dose X-ray CT image and output a third low-dose X-ray CT image corresponding to the second routine-dose X-ray CT image, a fourth neural network part configured to receive an output image of the third neural network part and output a third routine-dose X-ray CT image corresponding to the output image, a first discriminator configured to discriminate between the first low-dose X-ray CT image and the output image of the third neural network part, and a second discriminator configured to discriminate between the second routine-dose X-ray CT image and the output image of the first neural network part.

According to an exemplary embodiment, an image processing method may include receiving a low-dose X-ray CT image and reconstructing a CT image denoised from the low-dose X-ray CT image using a unsupervised learning based denoising neural network.

The neural network may include a neural network based on a convolutional framelet.

According to an exemplary embodiment, an image processing device may include a reception unit configured to receive a low-dose X-ray CT image and a reconstruction unit configured to remove noise from the low-dose X-ray CT image using a unsupervised learning based neural network learned using unmatched data to reconstruct a routine-dose X-ray CT image corresponding to the low-dose X-ray CT image.

The neural network may be learned based on a predefined identity loss, a predefined cyclic loss, and a predefined adversarial loss, with respect to the low-dose X-ray CT image and the routine-dose X-ray CT image.

The neural network may include a neural network based on a convolutional framelet.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
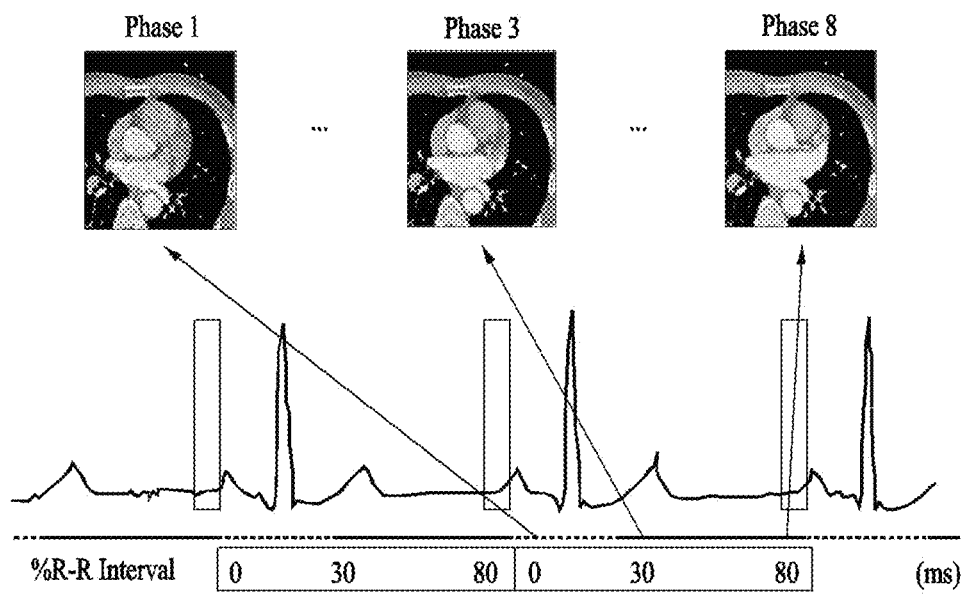
FIG. 1 is a drawing illustrating an example of multiphase coronary CTA acquisition protocol.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other components, steps, operations, and/or elements other than stated, components, steps, operations, and/or elements but do not exclude presence of additional elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, a description will be given in detail of exemplary embodiments of the inventive concept with reference to the accompanying drawings. Like reference numerals are used for the same components shown in each drawing, and a duplicated description of the same components will be omitted.

In coronary CTA, even though the images at the low-dose and high-dose phases do not match each other exactly due to the cardiac motion, they are from the same cardiac volume so that they have important correspondence. Therefore, it may be conjectured that the correctly denoised low-dose phase should follow the routine-dose phase image distribution more closely and learning between two phase cardiac images is more effective than learning from totally different images.

Embodiments of the inventive concept may be the gist of removing noise from a low-dose X-ray CT image using a unsupervised learning based neural network learned using unmatched data to reconstruct the low-dose X-ray CT image as a high-quality image, for example, a routine-dose X-ray CT image.

Herein, an embodiment of the inventive concept may reconstruct an image using a neural network capable of cancelling noise of a CT image obtained at a low-dose phase by learning a CT image at a routine-dose phase.

Although a supervised learning method is not facilitated due to a difference between basic hear structures of two phases, since two phase images have a close relation, an embodiment of the inventive concept may indeed improve the CT images at the low-dose phase by learning the distribution of the images at the high-dose phases using the cyclic consistency.

An embodiment of the inventive concept may train two networks $G_{AB}$: A→B and $G_{BA}$: B→A where A and B are two different domains (low dose and routine dose). Herein, $G_{AB}$ refers to the network which has A as an input and has B as an output, and $G_{BA}$ refers to the network which has B as an input and has A as an output. Then, the training goal may be that $G_{AB}$ and $G_{BA}$ should be inverse of each other, that is, $G_{BA}(G_{AB}(X_A)) \approx X_A$ and $G_{AB}(G_{BA}(X_B)) \approx X_B$. Thanks to the existence of inverse path, the degeneracy problem of mapping in the generative adversarial network (GAN) may be avoided. In addition, an embodiment of the inventive concept may use the identity loss. In contrast to the standard cycle GAN, the changes that an embodiment of the inventive concept expects from the generator are only the noise contributions that should be considered to avoid generating artificial features that are not present in the input images.

Herein, a neural network used in an embodiment of the inventive concept may include a neural network based on a convolutional framelet.

The convolutional framelet may be represented for the input signal f using the local basis $\psi_j$ and the non-local basis $\phi_i$ and may be represented as Equation 1 below.

$$f = \frac{1}{d} \sum_{i=1}^{n} \sum_{j=1}^{q} \langle f, \phi_i \otimes \psi_j \rangle \tilde{\phi}_i \otimes \tilde{\psi}_j \quad \text{[Equation 1]}$$

Herein, $\phi_i$ denotes the linear transform operator with the non-local basis vector, and $\psi_j$ denotes the linear transform operator with the local basis vector.

In this case, the local basis vector and the non-local basis vector may have the dual basis vectors $\tilde{\phi}_j$ and $\tilde{\psi}_j$, respectively, which are orthogonal to each other. The orthogonal relationship between the basis vectors may be defined as Equation 2 below.

$$\Phi\Phi^T = \sum_{i=1}^{m} \tilde{\phi}_i \phi_i^T = I_{n \times n}, \Psi\tilde{\Psi}_i = \sum_{j=1}^{q} \psi_j \tilde{\psi}_j^T = I_{d \times d} \quad \text{[Equation 2]}$$

Using Equation 2 above, the convolutional framelet may be represented as Equation 3 below.

$$H_d(f) = \Phi\Phi^T H_d(f) \Psi\Psi^T = \Phi C \Psi^T$$

$$C = \Phi^T H_d(f) \Psi = \Phi^T (f \otimes \Psi) \quad \text{[Equation 3]}$$

Herein, $H_d$ denotes the Hankel matrix operator, which may allow the convolutional operation to be represented as the matrix multiplication, and C denotes the convolutional framelet coefficient which is the signal transformed by the local basis and the non-local basis.

The convolutional framelet coefficient C may be reconstructed as the original signal by applying the dual basis vectors $\tilde{\phi}_j$ and $\tilde{\psi}_j$. The reconstruction process may be represented as Equation 4 below.

$$f = (\Phi C) \otimes \tau(\Psi) \quad \text{[Equation 4]}$$

As such, the technique of representing the input signal through the local basis and the non-local basis may be the convolutional framelet.

Figure 2:
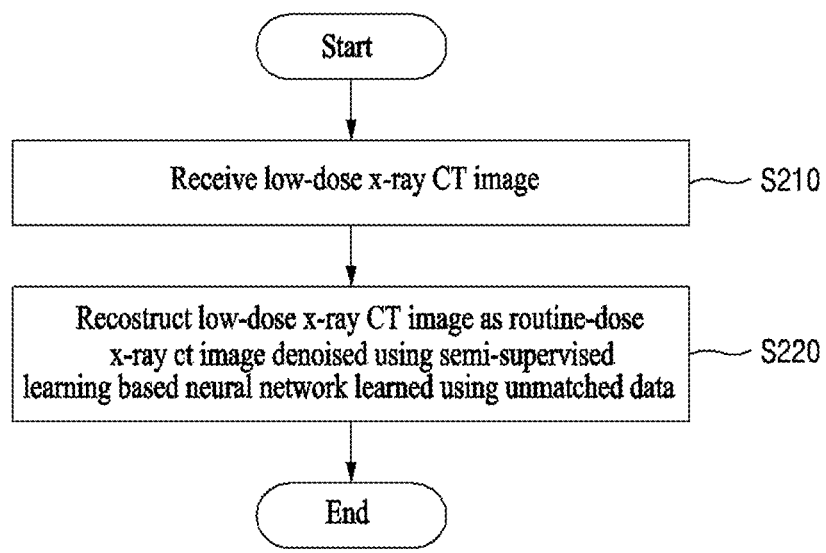
FIG. 2 is a flowchart illustrating an image processing method according to another embodiment of the inventive concept.

FIG. 2 is a flowchart illustrating an image processing method according to another embodiment of the inventive concept.

Referring to FIG. 2, the method according to an embodiment of the inventive concept may include receiving (S210) a low-dose X-ray CT image and removing (S220) noise from the received low-dose X-ray CT image using a unsupervised based neural network learned using unmatched data to reconstruct the low dose X-ray CT image as the denoised routine-dose X-ray CT image.

Herein, the low-dose X-ray CT image received in operation S210 may include a low-dose X-ray CT image of coronary CTA.

Herein, the neural network used in operation S220 may include a neural network based on a convolutional framelet and may be learned based on a predefined identity loss, a predefined cyclic loss, and a predefined adversarial loss, with respect to the low-dose X-ray CT image and the routine-dose X-ray CT image.

A description will be given in detail below of the method according to an embodiment of the inventive concept.

Framework

Figure 3:
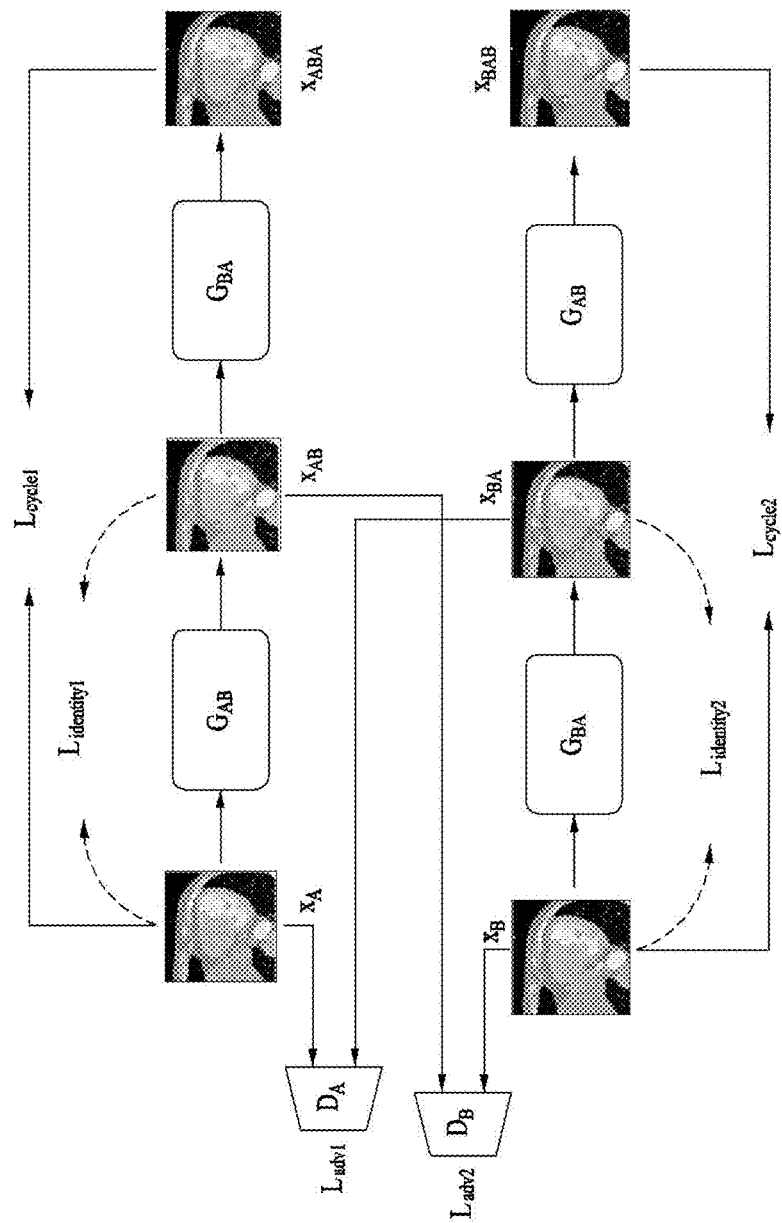
FIG. 3 is a drawing illustrating a framework for a low-dose CT image denoising network architecture according to an embodiment of the inventive concept.

FIG. 3 is a drawing illustrating a framework for a low-dose CT image denoising network architecture according to an embodiment of the inventive concept.

(A) shown in FIG. 3 denotes the low-dose CT domain and (B) denotes the routine-dose (normal-dose) CT domain. $P_A$ and $P_B$ denote the data distribution for each domain. The generator $G_{AB}$ denotes the network which receives (A) and outputs (B), and the $G_{BA}$ receives (B) and outputs (A). Herein, the generator $G_{AB}$ denotes the mapping from (A) to (B), and $G_{BA}$ are similarly defined as the mapping from (B) to (A).

The generators $G_{AB}$ and $G_{BA}$ may be the neural network which reconstructs the low-dose CT image as the routine-dose CT image and the neural network which generate noise in the routine-dose CT image like the low-dose CT image, respectively.

As for the generator, an embodiment of the inventive concept may employ the optimized network for a noise reduction in low-dose CT images. There may be two adversarial discriminators $D_A$ and $D_B$ which discriminate between measured input images and synthesized images from the generators.

In other words, the framework shown in FIG. 3 may include the first generator $G_{AB}$, the second generator $G_{BA}$, the first discriminator $D_A$, and the second discriminator $D_B$. Since there is no accurately matched image, the two networks $G_{AB}$ and $G_{BA}$ may be simultaneously learned to match the two domain distributions.

The first generator $G_{AB}$ may receive the captured low-dose X-ray CT image $X_A$ and may output the routine-dose X-ray CT image $X_{AB}$ denoised from the low-dose X-ray CT image. The first generator $G_{AB}$ may receive the low-dose X-ray CT image $X_{BA}$ output by the second generator $G_{BA}$ and may output the routine-dose X-ray CT image $X_{BAB}$ denoised from the low-dose X-ray CT image $X_{BA}$.

The second generator $G_{BA}$ may receive the captured routine-dose X-ray CT image $x_B$ and may output the low-dose X-ray CT image $X_{BA}$ in which noise is added to the routine-dose X-ray CT image $x_B$. The second generator $G_{BA}$ may receive the routine-dose X-ray CT image $x_{AB}$ output by the first generator $G_{AB}$ and may output the routine-dose X-ray CT image $X_{ABA}$ in which noise is added to the routine-dose X-ray CT image $X_{AB}$.

The first discriminator $D_A$ may be the neural network which discriminates between the low-dose X-ray CT image $X_A$ and the low-dose X-ray CT image $X_{BA}$. The second discriminator $D_B$ may be the neural network which discriminates between the routine-dose X-ray CT image $x_{AB}$ and the routine-dose X-ray CT image $X_B$.

$L_{identity1}$ and $L_{identity2}$ may denote the identity loss between the low-dose X-ray CT image $X_A$ and the routine-dose X-ray CT image $X_{AB}$ and the identity loss between the routine-dose X-ray CT image $x_B$ and the low-dose X-ray CT image $x_{BA}$, respectively.

$L_{cycle1}$ and $L_{cycle2}$ may denote the cyclic loss between the low-dose X-ray CT image $X_A$ and the routine-dose X-ray CT image $X_{ABA}$ and the cyclic loss between the routine-dose X-ray CT image $x_B$ and the routine-dose X-ray CT image $x_{BAB}$, respectively.

$L_{adv1}$ and $L_{adv2}$ may denote the adversarial loss of the first discriminator $D_A$ and the adversarial loss of the second discriminator $D_B$, respectively.

A description will be given in detail below of such an identity loss, a cyclic loss, and an adversarial loss.

The generators and discriminators may be simultaneously trained. Specifically, an embodiment of the inventive concept aims to solve the following optimization problem:

$$\min_{G_{AB},G_{BA},D_A,D_B} \max \int (G_{AB}, G_{BA}, D_A, D_B)$$ [Equation 5]

Herein, the overall loss may be defined by Equation 6 below.
[Equation 6]

$$\int(G_{AB}, G_{BA}, D_A, D_B) = \int_{GAN}(G_{AB}, D_B, A, B) + \int_{GAN}(G_{BA}, D_A, B, A) + \lambda \int_{cyclic}(G_{AB}, G_{BA}) + \gamma \int_{identity}(G_{AB}, G_{BA})$$

Herein, $\lambda$ and $\gamma$ denote parameters which control the importance of the losses, and $\int_{GAN}$, $\int_{cyclic}$, and $\int_{identit}$ denote the adversarial loss, cyclic loss, and identity loss, respectively.

A description will be given in detail below of the adversarial loss, cyclic loss, and identity loss.

Loss Formulation

Adversarial Loss

An embodiment of the inventive concept may employ adversarial losses using GAN. According to the original GAN, the generator $G_{AB}$ and the discriminator $D_B$ may be trained by solving the following min-max problem such as Equation 7 below.

$$\min_{G_{AB}} \max_{D_B} \int_{GAN}(G_{AB}, D_B, A, B) =$$ [Equation 7]
$$E_{x_B \sim P_B}[\log D_B(x_B)] + E_{x_A \sim P_A}[\log(1 - D_B(G_{AB}(x_A)))]$$

Herein, in Equation 7 above, $G_{AB}$ is trained to reduce a noise in the low-dose CT image $X_A$ to make it similar to the routine-dose CT image $x_B$, while $D_B$ is trained to discriminate between the denoised CT image $G_{AB}(x_A)$ and the routine-dose CT image $X_B$.

However, since the original adversarial loss is unstable during training process, an embodiment of the inventive concept may change the log-likelihood function to a least square loss as in the least squares GAN (LSGAN). Then, the min-max problem may be changed to the two minimization problems as Equation 8 below.

$$\min_{G_{AB}} E_{x_A \sim P_A}[(D_B(G_{AB}(x_A)) - 1)^2]$$ [Equation 8]

$$\min_{D_B} E_{x_B \sim P_B}[(D_B(x_B) - 1)^2] + E_{x_A \sim P_A}[D_B(G_{AB}(x_A))^2]$$

The adversarial loss may cause the generator to generate the denoised images that may deceive the discriminator to classify them as the real images at routine doses. At the same time, the adversarial loss may guide the discriminator to well distinguish the denoised image and the routine-dose image. Similar adversarial loss may be added to the generator $G_{BA}$, which generates noisy images.

Cyclic Loss

With the adversarial losses, an embodiment of the inventive concept could train the generator $G_{AB}$ and $G_{BA}$ to produce the realistic denoised CT images and noisy CT images, respectively, but this does not guarantee that they have an inverse relation described in FIG. 3.

To enable one to one correspondence between the noisy and denoised images and to prevent from the degeneracy, the cycle which consists of two generators should be imposed to bring the input $X_A$ to the original image. The cyclic loss may be defined as Equation 9 below.

$$\int_{cyclic}(G_{AB}, G_{BA}) = E_{x_A \sim P_A}[\|G_{BA}(G_{AB}(x_A)) - x_A\|_1] + E_{x_B \sim P_B}[\|G_{AB}(G_{BA}(x_B)) - x_B\|_1]$$ [Equation 9]

Herein, $\|\cdot\|_1$ denotes the $l_1$-norm. Then, the cyclic loss enforces the constraint that $G_{AB}$ and $G_{BA}$ should be inverse of each other, i.e. it encourages $G_{BA}(G_{AB}(x_A)) \approx X_A$ and $G_{AB}(G_{BA}(X_B)) \approx X_B$.

Identity Loss

In multiphase CTA, there are often cases where the heart phase and dose modulation are not perfectly aligned as originally planned. For example, in the multiphase CTA acquisition, it is assumed that the systolic phase images should be obtained using low dose modulation, but due to the mismatch with the cardiac cycle from arrhythmia, the systolic phase image noise level may vary and even be in full dose. In this case, the input to the generator $G_{AB}$ may be at full dose, so it is important to train the generator so that it does not alter such clean images. Similarly, the generator $G_{BA}$ should not change the input images acquired at the low-dose level. To enforce the two generators $G_{AB}$ and $G_{BA}$ to satisfy these conditions, the following identity loss of Equation 10 below should be minimized.

$$\int_{identity}(G_{AB}, G_{BA}) = E_{x_B \sim P_B}[\|G_{AB}(x_B) - x_B\|_1] + E_{x_A \sim P_A}[\|G_{BA}(x_A) - x_A\|_1]$$ [Equation 10]

In other word, the generators should work as identity mappings for the input images at the target domain, as written in Equation 11 below.

$$G_{AB}(x_B) \approx x_B, G_{BA}(x_A) \approx x_A$$ [Equation 11]

This identity loss may be similar to the identity loss for the photo generation from paintings in order to maintain the color composition between input and output domains. The constraints may ensure that the correctly generated output images no longer vary when used as inputs to the same network, i.e. the target domain should be the fixed points of the generator. This constraint may be important to avoid creating artificial features.

Network Architecture

Figure 4:
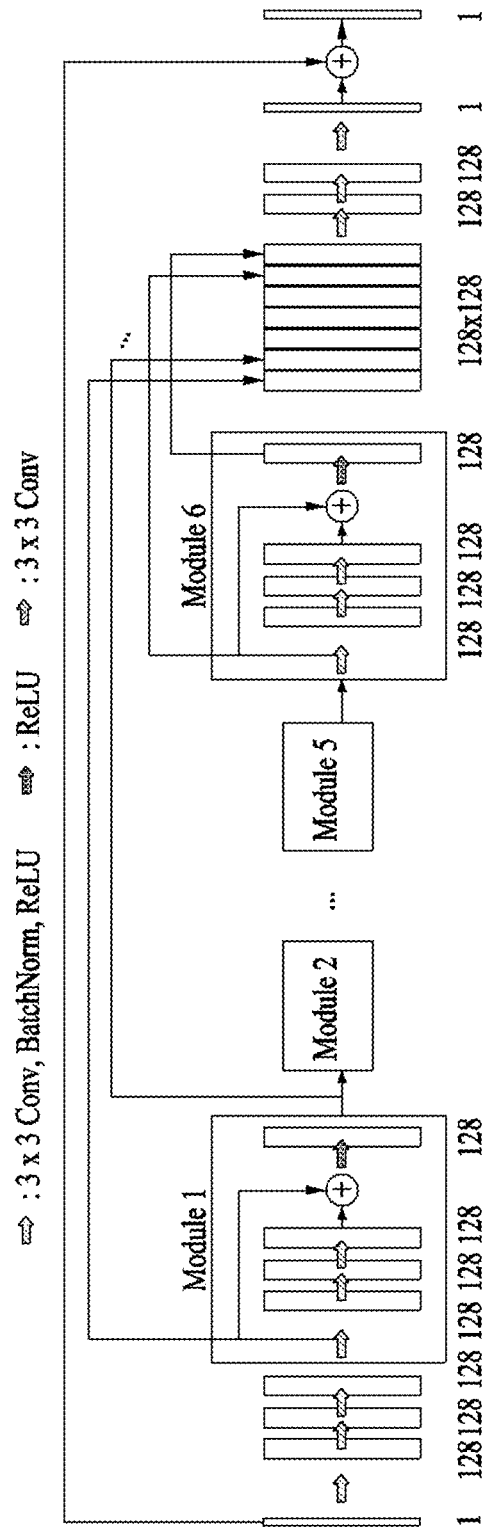
FIG. 4 is a drawing illustrating an example of a network architecture of two generators.

FIG. 4 is a drawing illustrating an example of a network architecture of two generators. This network architecture shown in FIG. 4 is optimized for low-dose CT image denoising.

As shown in FIG. 4, the first convolution layer may use 128 set of 3×3 convolution kernels to produce 128 channel feature maps. An embodiment of the inventive concept may have 6 sets of module composed of 3 sets of convolution layers for performing linear transform computation, batch normalization layers for performing normalization computation, and ReLU layers for performing nonlinear function computation, and one bypass connection with a ReLU layer.

Convolution layers in the modules may use 128 sets of 3×3×128 convolution kernels. In addition, the proposed network has a concatenation layer that concatenates the inputs of each module and the output of the last module, which is followed by the convolution layer with 128 sets of 3×3×896 convolution kernels. Herein, this concatenation layer has a signal boosting effect using multiple signal representation and provides various paths for gradient back-propagation.

The last convolution layer may use 15 sets of 3×3×128 convolution kernels. An embodiment of the inventive concept may add an end-to-end bypass connection to estimate the noise-free image while exploiting the advantages of bypass connection.

Figure 5:
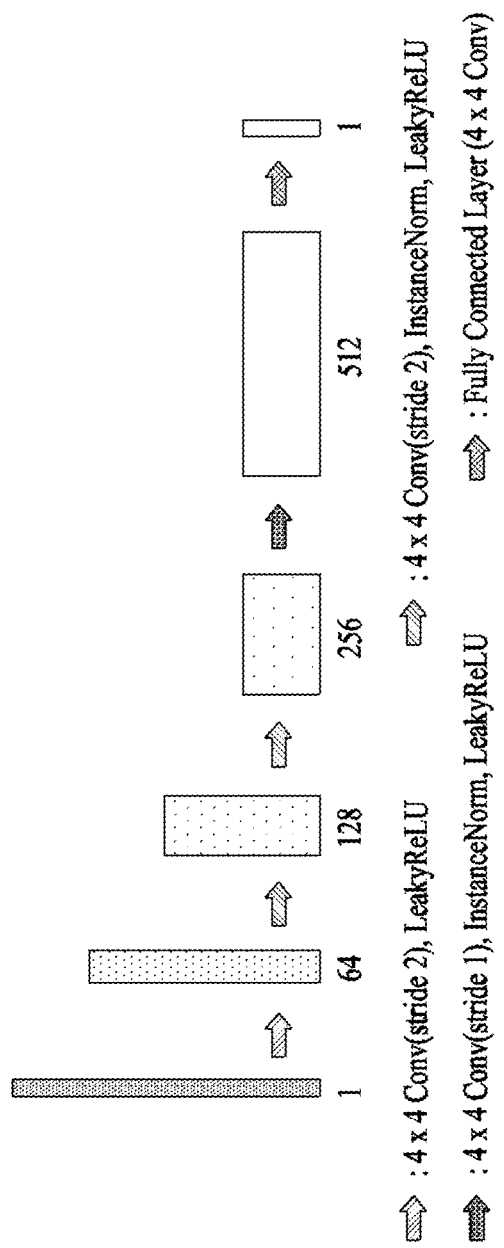
FIG. 5 is a drawing illustrating an example of a network architecture of two discriminators.

FIG. 5 is a drawing illustrating an example of a network architecture of two discriminators $D_A$ and $D_B$. The network architecture shown in FIG. 5 may include a network architecture in PatchGAN (P. Isola, J.-Y. Zhu, T. Zhou, and A. A. Efros, "Image-to-image translation with conditional adversarial networks," in 2017 IEEE Conference on Computer Vision and Pattern Recognition (CVPR), 2017.), which classifies 70×70 overlapping image patches to see whether they are real or synthesized.

The network architecture shown in FIG. 5 may consist of 5 convolution layers including the last fully-connected layer. The first convolution layer may use 64 sets of 4×4 convolution kernels, and the number of convolution kernels in the following layers is twice that of the previous layer except the last fully connected layer. Arbitrary sized images may be applied to this discriminator network.

Data: Cardiac CT Scans

The study cohort may comprise 50 CT scans of mitral valve prolapse patients and 50 CT scans of coronary artery disease patients, and the CT scan protocols may be preset. The mean age of the population may be 58±13.2 years, and the mean body weight may be 66:2±12:6 kg. Using a second generation dual source CT scanner, electrocardiography (ECG)-gated cardiac CT scanning may be performed.

Retrospective ECG-gated spiral scan with ECG-based tube current modulation may be applied to multiphase of 0-90% of the R-R interval which comprises with a full dose pulsing window of 30-80% of the R-R interval. The tube current may be reduced to 20% of the maximum outside the ECG pulsing window. A bolus of 70-90 mL of contrast material may be administered by a power injector at a rate of 4.0 mL/s and followed by 40 mL saline. The bolus tracking method including the region of interest (e.g., the ascending aorta), the attenuation threshold level (e.g., 100 HU), and the scan delay (e.g., 8 s) may be applied to determine scan time. In all CT scans, tube voltage and the tube current-exposure time product may be adjusted according to the patient's body size, and the scan parameters may include the tube voltage of 80-120 kV, the tube current-exposure time product of 185-380 mAs, the collimation of 128×0.6 mm, and the gantry rotation time of 280 s. Mean effective radiation dose of CCTA may be 11.4±6.2 mSv. Standard cardiac filter may be used for imaging reconstruction.

Training

Training may be performed by minimizing the loss function of Equation 6 above with $\lambda=10$ and $\gamma=5$. An embodiment of the inventive concept may apply the ADAM optimization method to train all networks with $\beta_1=0.5$ and $\beta_2=0.999$. The number of epochs (the number of training) may be 200, which is divided into two phases to control the learning rate during the training. In the first 100 training, an embodiment of the inventive concept may set the learning rate to 0.0002, and may linearly decrease it to zero over the next 100 training. The size of patch may be 56×56 and the size of mini-batch may be 10. Kernels may be initialized randomly from a Gaussian distribution. An embodiment of the inventive concept may alternately update the generator and the discriminator at each epoch.

An embodiment of the inventive concept may normalize the intensity of the input low-dose CT images and the target routine-dose CT image using the maximum intensity value of the input low-dose CT images, and may subtract 0.5 and may multiply two to make the input image intensity range as $[-1, 1]$.

Evaluation

Visual Grading Analysis

An embodiment of the inventive concept may assess qualitative image quality using relative visual grading analysis (VGA). This VGA method may be planned to be related to the clinical task to evaluate any structural abnormality that may present at specific anatomical structures in CT images. Two expert cardiac radiologists establish a set of anatomical structures to evaluate image quality. Table 1 below demonstrates the 13 anatomical structures used in an embodiment of the inventive concept. The VGA scoring scale is shown in Table 2 below.

TABLE 1

| Organ | Structure |
| --- | --- |
| Left/right coronary artery | LCA ostium |
|  | LCA distal 1.5 cm |
|  | LCA distal |
|  | RCA ostium |
|  | RCA 1.5 cm |
|  | RCA distal |
| Cardiac wall | LV septum |
|  | RV free wall margin |
| Cardiac cavity | LV trabeculation |
|  | Left arterial appendage |
| Arota | Aortic root |
| Valve | Aortic valve |
|  | Mitral valve |

TABLE 2

| Score | Visibility of the structures in relation to the reference images |
| --- | --- |
| 1 | Poor image quality |
| 2 | Lower image quality |
| 3 | Mild noise, but acceptable |
| 4 | Average |
| 5 | Good |
| 6 | Excellent |

All CT images including denoising CT images may be uploaded on picture archiving and communication system (PACS) for visual grading. Randomly selected 25 CT scans from mitral valve prolapse patients and 25 CT scans from coronary artery disease patients may be included for VGA. Total 1300 CT images (50 selected CT scans×13 structures× original and denoising CT) may be scored. Two radiologists may perform VGA, and all CT scans may be scored independently, without side-by-side comparison.

Quantitative Analysis

The image noise and signal-to-noise (SNR) of all images may be obtained at four anatomical structures, for example, ascending aorta, left ventricular cavity, left ventricular septum, and proximal right coronary artery. The size of region of interest to evaluate SNR may vary to fit each anatomic structure, but it may be confined into each structure without overlapping other structures.

Statistical Analysis

An embodiment of the inventive concept may compare VGA scores obtained from original CT images and denoising images using chi-square test. Image noise and SNR may be compared using paired t-test. P-values of less than 0.05 may indicate statistical significance. Herein, statistical analyses may be performed using commercial software.

Figure 6:
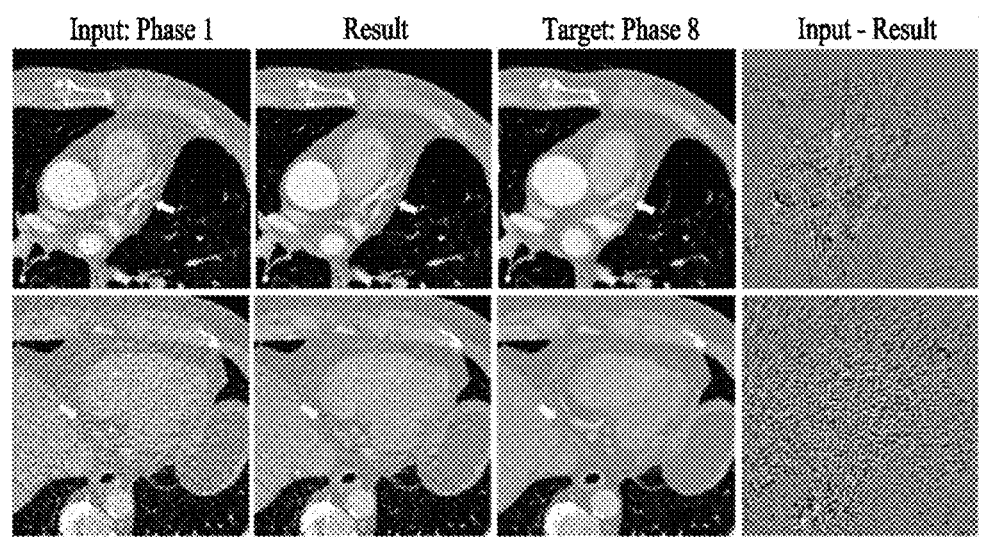
FIG. 6 is a drawing illustrating an example of restoration results of a low-dose cardiac CT image by a method according to an embodiment of the inventive concept.

FIG. 6 is a drawing illustrating an example of restoration results of a low-dose cardiac CT image by a method according to an embodiment of the inventive concept. FIG. 6 illustrates restoration results from the dataset of mitral valve prolapse patients. Herein, FIG. 6 illustrates restoration results from the low-dose cardiac CT image using the generator $G_{AB}$ according to an embodiment of the inventive concept. The arrow indicates the distinctly different region between the input image from phase 1 and the target image from phase 8.

As may be observed in the difference images (input-result) between the input image and the result image shown in FIG. 6, it may be verified that noise is only removed to reconstruct the image clearly and information of the low-dose CT image which is the real input value remains intact.

Figure 7:
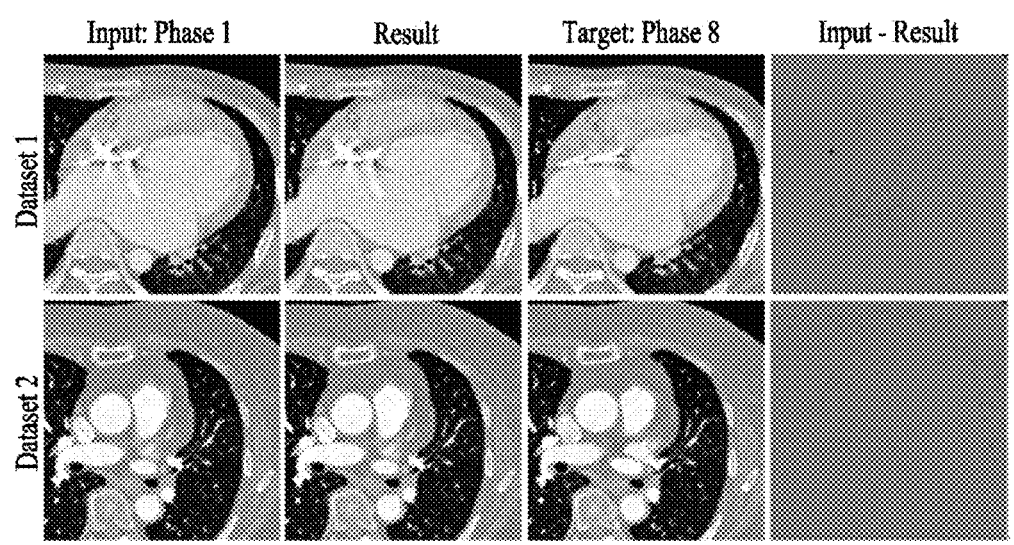
FIG. 7 is a drawing illustrating another example of restoration results of a low-dose cardiac CT image by a method according to another embodiment of the inventive concept.

FIG. 7 is a drawing illustrating another example of restoration results of a low-dose cardiac CT image by a method according to another embodiment of the inventive concept. FIG. 7 illustrates image restoration results when the noise level of the low-dose X-ray CT image is similar to that of the routine-dose X-ray CT image.

For example, FIG. 7 illustrates restoration results for data with noise of the routine-dose X-ray CT image in phase 1 since the cardiac impulse and the image capture time are not exactly matched. As may be observed in FIG. 7, the neural network $G_{AB}$ according to an embodiment of the inventive concept satisfies predetermined identification conditions of only removing noise, shows advantages of being robust to the noise level, and does not make artificial features. This may be a considerably important portion in medical images and may be a great advantage of the neural network according to an embodiment of the inventive concept.

As such, the method according to an embodiment of the inventive concept may remove noise from a low-dose X-ray CT image using a unsupervised learning based neural network learned using unmatched data to reconstruct the low-dose X-ray CT image as a high-quality image.

Furthermore, the method according to an embodiment of the inventive concept may increase reconstruction performance, may reduce an amount of calculation necessary for reconstruction, and may enhance a reconstruction speed by configuring a neural network using a local basis and a non-local basis according to a convolutional framelet.

Furthermore, the method according to an embodiment of the inventive concept is applicable to enhancing image quality of various medical images, such as CT and MRI images, when ensuring unmatched data, other than when it is difficult to fundamentally obtain matched data such as cardiac CT. Furthermore, the method according to an embodiment of the inventive concept is applicable to the low-dose X-ray CT image reconstruction which reduces the amount of radiation emission and is applicable to various CT techniques.

Figure 8:
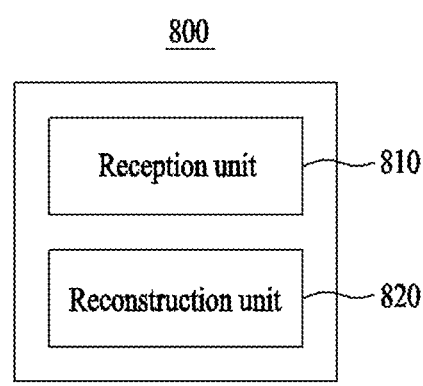
FIG. 8 is a block diagram illustrating a configuration of an image processing device according to an embodiment of the inventive concept.

FIG. 8 is a block diagram illustrating a configuration of an image processing device according to an embodiment of the inventive concept. FIG. 8 illustrates a configuration of a device which performs FIGS. 2 to 7.

Referring to FIG. 8, an image processing device 800 according to an embodiment of the inventive concept may include a reception unit 810 and a reconstruction unit 820.

The reception unit 810 may receive a low-dose X-ray CT image.

Herein, the reception unit 810 may receive a low-dose X-ray CT image of coronary CTA.

The reconstruction unit 820 may remove noise from the low-dose X-ray CT image using a unsupervised learning based neural network learned using unmatched data to reconstruct a routine-dose X-ray CT image corresponding to the low-dose X-ray CT image.

Herein, the neural network may be learned based on a predefined identity loss, a predefined cyclic loss, and a predefined adversarial loss, with respect to the low-dose X-ray CT image and the routine-dose X-ray image and may be learned in a network architecture shown in FIG. 3. In detail, the neural network may learn a first generator $G_{AB}$, a second generator $G_{BA}$, a first discriminator $D_A$, and a second discriminator $D_B$ based on an identity loss between a low-dose X-ray CT image $X_A$ and a routine-dose X-ray CT image $X_{AB}$ and identity losses $L_{identity1}$ and $L_{identity2}$ between a routine-dose X-ray CT image $x_B$ and a low-dose X-ray CT image $X_{BA}$, a cyclic loss between the low-dose X-ray CT image $X_A$ and a routine-dose X-ray CT image $X_{ABA}$, cyclic losses $L_{cycle1}$ and $L_{cycle2}$ between the routine-dose X-ray CT image $x_B$ and a routine-dose X-ray CT image $X_{BAB}$, and an adversarial loss of the first discriminator $D_A$ and adversarial losses $L_{adv1}$ and $L_{adv2}$ of the second discriminator $D_B$.

Herein, the neural network may include a neural network based on a convolutional framelet.

It is apparent to those skilled in the art that, although the description is omitted in the image processing device 800 of FIG. 8, the respective components configuring FIG. 8 may include all details described in FIGS. 1 to 7.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to embodiments of the inventive concept, the image processing device may remove noise from a low-dose X-ray CT image using a unsupervised learning based neural network learned using unmatched data to reconstruct the low-dose X-ray CT image as a high-quality image.

According to embodiments of the inventive concept, the image processing device may increase reconstruction performance, may reduce an amount of calculation necessary for reconstruction, and may enhance a reconstruction speed by configuring a neural network using a local basis and a non-local basis according to a convolutional framelet.

According to embodiments of the inventive concept, the image processing device is applicable to enhancing image quality of various medical images, such as CT and MRI images, when ensuring unmatched data, other than when it is difficult to fundamentally obtain matched data such as cardiac CT. Furthermore, the image processing device is applicable to the low-dose X-ray CT image reconstruction which reduces the amount of radiation emission and is applicable to various CT techniques.

Such an embodiment of the inventive concept may be a unsupervised learning based algorithm for learning a neural network using unmatched data which departs from the limitation of the supervised learning.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An image processing method, comprising:
receiving a low-dose X-ray computed tomography (CT) image;
removing noise from the low-dose X-ray CT image using a unsupervised learning based neural network learned using unmatched data to reconstruct a routine-dose X-ray CT image corresponding to the low-dose X-ray CT image; and
learning a first neural network, a second neural network, and a discriminator based on an identity loss between a captured first low-dose X-ray CT image and a denoised first routine-dose X-ray CT image output using the first neural network, a cyclic loss between the first low-dose X-ray CT image and a second low-dose X-ray CT image including noise, output using the second neural network which receives the first routine-dose X-ray CT image, and an adversarial loss of the discriminator for discriminating between the first low-dose X-ray CT image and a third low-dose X-ray CT image for a captured second routine-dose X-ray CT image output using the second neural network;
wherein the reconstructing comprises:
reconstructing the routine-dose X-ray image corresponding to the low-dose X-ray CT image using the learned first neural network.

2. The image processing method of claim 1, wherein the neural network is learned based on a predefined identity loss, a predefined cyclic loss, and a predefined adversarial loss, with respect to the low-dose X-ray CT image and the routine-dose X-ray CT image.

3. The image processing method of claim 1, wherein the neural network comprises:
a neural network based on a convolutional framelet.

4. An image processing method, comprising:
receiving a low-dose X-ray computed tomography (CT) image; and
removing noise from the low-dose X-ray CT image using a unsupervised learning based neural network learned using unmatched data to reconstruct a routine-dose X-ray CT image corresponding to the low-dose X-ray CT image;
wherein the neural network comprises:
a first neural network part configured to receive a first low-dose X-ray CT image and output a first routine-dose X-ray CT image corresponding to the first low-dose X-ray CT image;
a second neural network part configured to receive an output image of the first neural network part and output a second low-dose X-ray CT image corresponding to the output image;
a third neural network part configured to receive a second routine-dose X-ray CT image and output a third low-dose X-ray CT image corresponding to the second routine-dose X-ray CT image;
a fourth neural network part configured to receive an output image of the third neural network part and output a third routine-dose X-ray CT image corresponding to the output image;
a first discriminator configured to discriminate between the first low-dose X-ray CT image and the output image of the third neural network part; and
a second discriminator configured to discriminate between the second routine-dose X-ray CT image and the output image of the first neural network part.

5. An image processing device, comprising:
a reception unit configured to receive a low-dose X-ray CT image; and
a reconstruction unit configured to remove noise from the low-dose X-ray CT image using a unsupervised learning based neural network learned using unmatched data to reconstruct a routine-dose X-ray CT image corresponding to the low-dose X-ray CT image;
wherein the image processing device is configured to:
learn a first neural network, a second neural network, and a discriminator based on an identity loss between a captured first low-dose X-ray CT image and a denoised first routine-dose X-ray CT image output using the first neural network, a cyclic loss between the first low-dose X-ray CT image and a second low-dose X-ray CT image including noise, output using the second neural network which receives the first routine-dose X-ray CT image, and an adversarial loss of the discriminator for discriminating between the first low-dose X-ray CT image and a third low-dose X-ray CT image for a captured second routine-dose X-ray CT image output using the second neural network; and
wherein the reconstruction unit is further configured to:
reconstruct the routine-dose X-ray image corresponding to the low-dose X-ray CT image using the learned first neural network.

6. The image processing device of claim 5, wherein the neural network is learned based on a predefined identity loss, a predefined cyclic loss, and a predefined adversarial loss, with respect to the low-dose X-ray CT image and the routine-dose X-ray CT image.

7. The image processing device of claim 5, wherein the neural network comprises:
a neural network based on a convolutional framelet.

8. An image processing device, comprising:
a reception unit configured to receive a low-dose X-ray CT image; and
a reconstruction unit configured to remove noise from the low-dose X-ray CT image using a unsupervised learning based neural network learned using unmatched data to reconstruct a routine-dose X-ray CT image corresponding to the low-dose X-ray CT image;
wherein the neural network comprises:
a first neural network part configured to receive a first low-dose X-ray CT image and output a first routine-dose X-ray CT image corresponding to the first low-dose X-ray CT image;
a second neural network part configured to receive an output image of the first neural network part and output a second low-dose X-ray CT image corresponding to the output image;
a third neural network part configured to receive a second routine-dose X-ray CT image and output a third low-dose X-ray CT image corresponding to the second routine-dose X-ray CT image;
a fourth neural network part configured to receive an output image of the third neural network part and output a third routine-dose X-ray CT image corresponding to the output image;
a first discriminator configured to discriminate between the first low-dose X-ray CT image and the output image of the third neural network part; and
a second discriminator configured to discriminate between the second routine-dose X-ray CT image and the output image of the first neural network part.

* * * * *